TAPE TENSION CONTROL MEANS

Filed June 1, 1964

4 Sheets-Sheet 1

INVENTORS.
EDGAR WOLF
WILLIAM D. COHEN
DANIEL M. KLANG

BY S. C. Yuter

ATTORNEY

June 6, 1967 E. WOLF ETAL 3,323,736

TAPE TENSION CONTROL MEANS

Filed June 1, 1964 4 Sheets-Sheet 2

INVENTORS.
EDGAR WOLF
WILLIAM D. COHEN
DANIEL M. KLANG

BY [signature]

ATTORNEY

June 6, 1967 E. WOLF ETAL 3,323,736

TAPE TENSION CONTROL MEANS

Filed June 1, 1964 4 Sheets-Sheet 3

INVENTORS.
EDGAR WOLF
WILLIAM D. COHEN
DANIEL M. KLANG

BY S. G. [signature]

ATTORNEY

TAPE TENSION CONTROL MEANS

Filed June 1, 1964

INVENTORS.
EDGAR WOLF
WILLIAM D. COHEN
DANIEL M. KLANG

BY S.C. Yuter

ATTORNEY

United States Patent Office 3,323,736

Patented June 6, 1967

3,323,736

TAPE TENSION CONTROL MEANS

Edgar Wolf, New Hyde Park, William D. Cohen, Syosset, and Daniel M. Klang, Huntington Station, N.Y., assignors to Digitronics Corporation, Albertson, N.Y., a corporation of Delaware Filed June 1, 1964, Ser. No. 371,516
8 Claims. (Cl. 242—55.12)

This invention relates to tape transport devices. More particularly, it relates to such devices which are suitable for use as tape handlers in high speed electronic data processing apparatus.

In the conventional use of tape as a storage medium for information which is to be provided to electronic data processing apparatus, the normal operation is for tape to be fed into a transducer which either reads therefrom or writes thereon. The information being read is supplied as an input to the data processing apparatus and the information being written is an output of this apparatus. Of necessity, the tape feeding operation is essentially one of moving tape past the transducing head in staccato-like bursts. Such feeding, accordingly, subjects the tape to sharp strains upon the initiation of and especially at the termination of a tape movement. Consequently, serious accidents often occur, such as the tearing or distortion of tape, and a possible uncompensated misalignment thereof which may result both in a loss of data processing apparatus time and a loss of the tape bearing information.

Generally, a tape transport of the abovementioned type comprises a tape feed reel and a tape takeup reel. Since the tape transport and the tape transducer are of necessity mechanical devices, their speed of operation is much slower than the operation rate of the electronic data processing equipment with which they are associated. It is readily appreciated that improvements in the speed of operation of the tape transport and transducer in an attempt to match the speed of the data processing equipment have to result in the tape being increasingly subjected to the dangers of snapping and tearing due to sharper sudden starts and stops and to the increased frequency of such starts and stops.

Investigation by the inventors has established that one of the main sources of danger to the tape, when being fed in its sudden sharp, short movements, is the lack of proper tape tension while the tape transport is in operation, i.e., the tape tension or slack is too great with respect to the feed and take up reels in the tape transport. One obvious manifestation of such excess slackness or tension is the excess length or brevity of the free loop of tape which exists with relation to each reel. Further investigation has also shown that, if the tensions are continually maintained in the tape loops at a correct value as determined by the physical nature of the tape, perforated, magnetic, etc., while tape is being moved, then the tensions to which the tape is subjected at sudden starts and stops is essentially compensated for whereby much higher speeds of tape handling are enabled.

Accordingly, it is an important object of this invention to provide a tape transport device in which there is continually provided automatic self-regulation of the tension in the tape loops of the take-up and feed-out reels to provide steady, proper tape tension whereby improved high speed operation of the transport device is enabled.

It is another object to provide a tape transport device in accordance with the preceding object wherein such self-regulation is provided in both directions of tape movement.

As will be further shown, for convenience of explanation, an "on-off" type of bidirectional tape transport device may be described as having three zones, viz., a take-up zone, i.e., one in which the tape tension is too slack, a neutral zone, i.e., one in which the tension in the tape is the proper amount, and a payout zone, i.e., one in which the tension in the tape is too great. The zone sensing is advantageously accomplished with micro-switches, optical devices and the like. The sensing of a too little or a too great tape tension causes an adjustment of tape tension to the desired neutral zone level by proper reel motor actuation. The zones other than the neutral zones may be conveniently denoted as active zones.

The reel motors of the tape transport device may be arranged such that there is provided a constant drag thereon. Such arrangement provides a reduced net torque ($T_M-T_D$) wherein $T_M$ is motor torque and $T_D$ is motor brake torque when the tape is in either the take-up or the payout tension zone. When the tape is in the neutral zone, the brake torque or force is substantially limited to the value of $T_D$.

It has been found that it may be advantageous for proper operation that a tape reel be brought to a complete halt in the neutral zone, since upon its entering an active zone from the opposite active zone with the reel still rotating in the direction corresponding to the action in the opposite zone, there may be produced oscillations.

Accordingly, it is another object of the invention to provide a tape transport device in accordance with the preceding objects in which the tape reels therein are brought to a complete halt upon their entering into the neutral zone.

It has also been found that it is advantageous to halt the rotation of the respective reel motors when the speed of the tape reel rims slightly exceeds the necessary speed for maintaining proper tension in the tape. In other words, the anticipation of the movement toward the neutral zone from an active zone when the motors are activated to cause a movement toward the neutral zone, enables improved self-regulation of tape tension and consequently enables the attaining of even higher speeds of operation of the tape transport device.

Accordingly, it is a further object of the invention to provide a tape transport device in accordance with the preceding objects wherein movement toward the neutral zone from an active zone is anticipated whereby automatic self-regulation of tape tension is enhanced.

Generally speaking and in accordance with the invention, there is provided tape transport means for a system for handling tape which is movable in opposite directions and which has information thereon which may be read therefrom or is adapted to have information recorded thereon, the system comprising transducing means for recording information on and reading information from the tape and which includes drive means for moving the tape in opposite directions and for stopping the tape. The tape transport means comprises a pair of reel mount means adapted to have mounted thereon respectively a tape payout reel for feeding tape to the transducing means and a tape takeup reel for receiving thereon tape emerging from the transducing means. Operatively associated with the payout reel mount means is a first bidirectional motor and brake means for rotating the payout reel mount means in opposite directions and operatively associated with the takeup reel mount means is a second bidirectional motor and brake means for rotating the takeup reels in opposite directions. There are further included first means responsive to the deviation of the tension in the payout tape loop from a first given tension for controlling the first motor and brake means to rotate the payout reel mount means in a direction to bring the payout tape loop to the first given tension and to then halt the payout reel mount means, and second means responsive to the deviation of the tension in the takeup tape loop from a second given tension for controlling the second motor and brake means to rotate the takeup reel mount means in a direction to bring the takeup tape loop to the second given tension and to then halt the takeup reel mount means.

The features of this invention which are believed to be new are set forth with particularity in the appended claims. The invention itself, however, may best be understood by reference to the following description when taken in conjunction with the accompanying drawings which show an embodiment of a tape transport according to the invention.

In the figures, FIG. 1 is a front elevation of an illustrative embodiment of a tape transport device constructed in accordance with the principles of the invention;

Figures 1, 2:
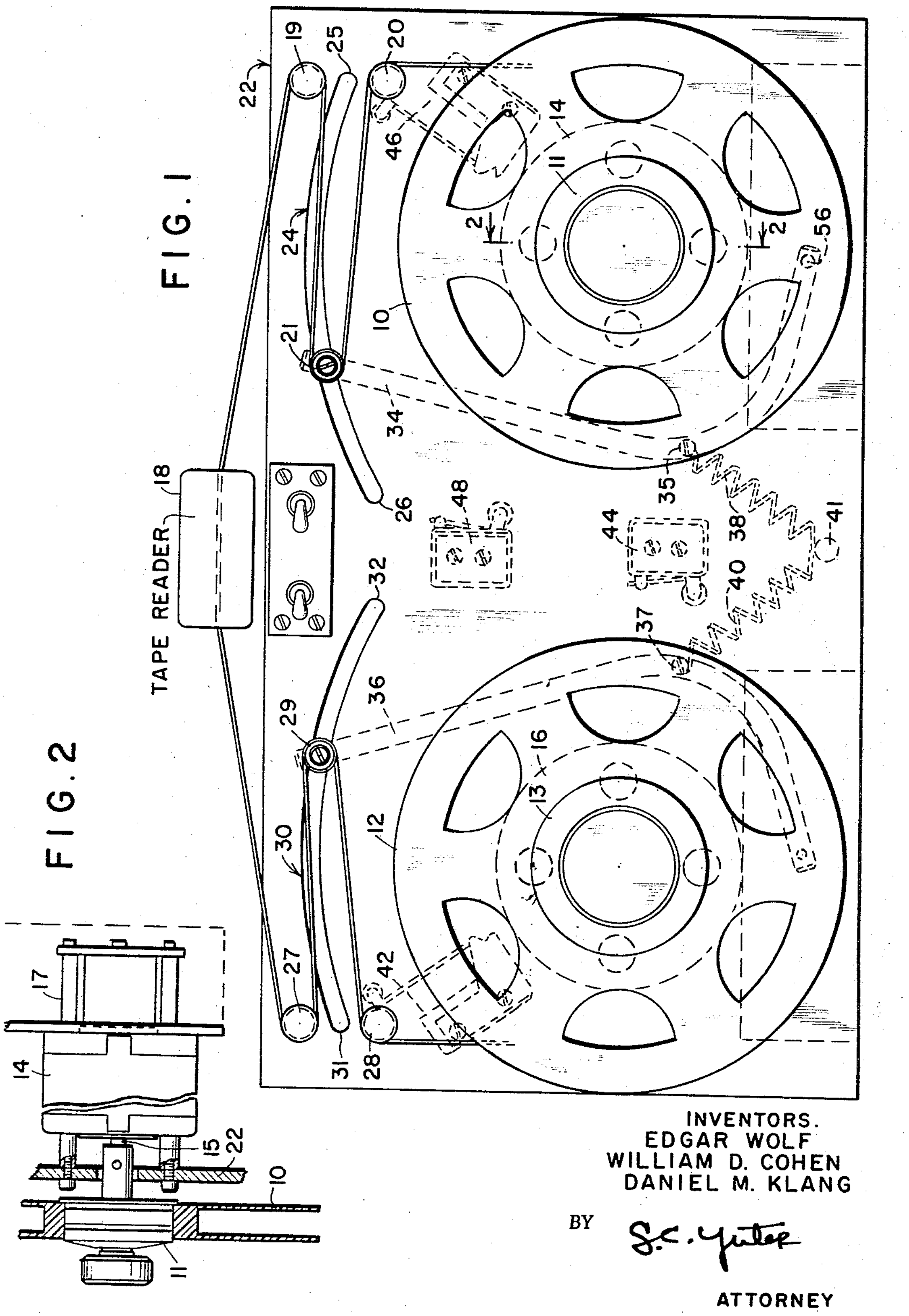
FIG. 2 is a side elevation of the device of FIG. 1 drawn in smaller scale and simplified to show only particular coacting structures therein.

Referring now to FIGS. 1 and 2 wherein there are shown front and side elevational views of an illustrative embodiment of a tape transport constructed in accordance with the principles of this invention, there are shown therein the right and left tape-reels 10 and 12 which are adapted to be mounted on reel mount assemblies 11 and 13, respectively. The right and left motor and brake assemblies 14 and 16 which control the rotation of assemblies 11 and 13 respectively include drive shafts which extend through the front plate of the device and terminate in the assemblies.

The tape transport device for feeding tape to a tape transducer such as a tape reader or a tape writer comprises right tape reel 10, i.e., the tape feed reel, a pair of rollers 19 and 20 fixedly mounted at the upper right portion of front plate 22 and a movably supported roller 21 which is received in and free to move in a right guide slot 24 extending through front plate 22.

In the operation of the feed mechanism, tape loaded on feed reel 10 is looped around rollers 20, 21 and 19 in that order and fed to tape reader 18 from roller 19. In the event of an increase in tension in the tape feed loop, i.e., the tape extending from roller 20 via roller 21 to roller 19, roller 21 is caused to move to the right in right guide slot 24 toward outer edge 25 thereof; in the event of an increase in slackness in the tape feed loop, roller 21 is caused to move to the inner edge 26 in right guide slot 24.

Similarly, the tape takeup device comprises takeup reel 12, rollers 27 and 28 fixedly mounted on front plate 22 at its upper left corner and a movably supported roller 29 which is free to move in left guide slot 30. In the operation of the tape takeup device, tape emerging from tape reader 18 is looped around roller 27, movably supported roller 29, and roller 28 and thence wound on takeup reel 12. In the even that tension in the tape takeup loop, i.e., the tape loop from roller 27 via roller 29 to roller 28, is increased, movably supported roller 29 is caused to move towards the left in left guide slot 30 toward outer edge 31 and when slackness in the takeup loop increases, movably supported roller 29 is caused to move toward the inner edge 32 in left guide slot 30.

Tape reader 18 may suitably be a conventional device of the type containing drive capstans, tape pinch rollers, tape read head solenoids, a tape read head, etc. Since such tape reader are well known in the art no further disclosure or description thereof is deemed necesary.

In FIG. 2, there is shown a side elevation of a portion of the device of FIG. 1 wherein there may be seen the right half thereof. In FIG. 2 it is seen that feed reel 10 is mounted on reel mount assembly 11, assembly 11 being affixed by a stud. The sleeved shaft 15 of right motor 14 extends through front plate 22 and terminates in assembly 11. Structure 17 depicts the brake associated with right motor 14.

Figure 3:
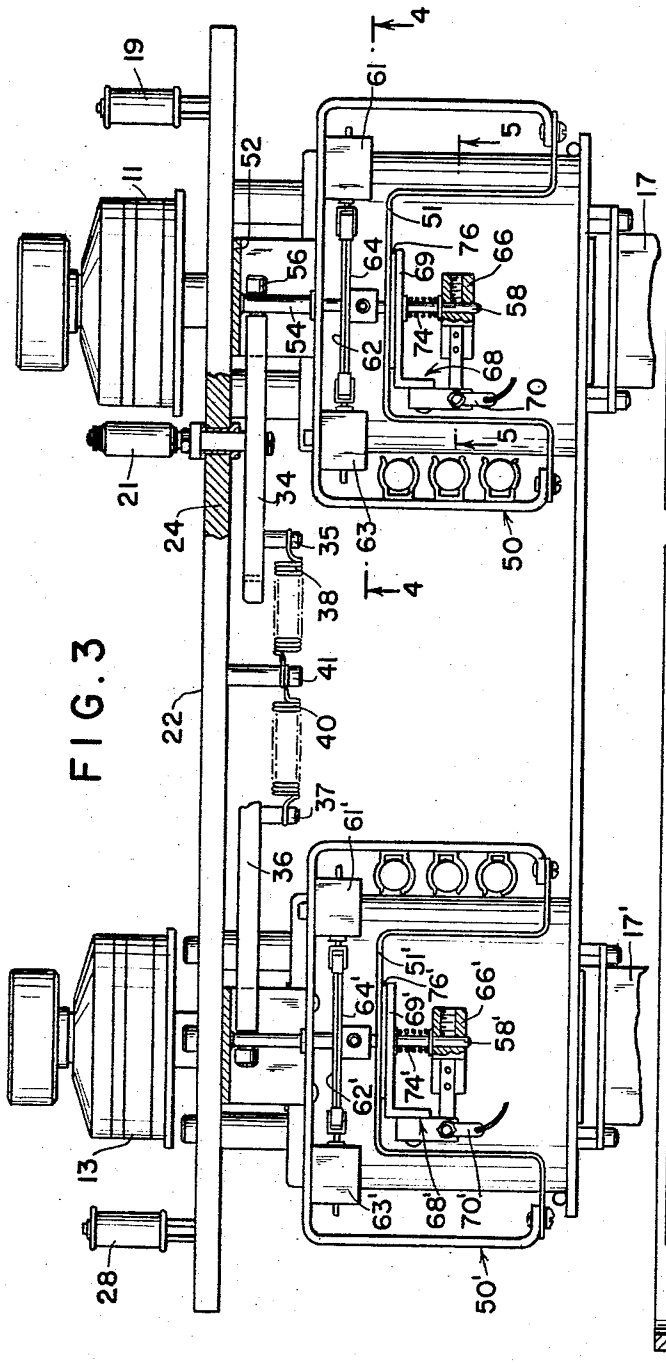
FIG. 3 is a bottom view of the device of FIG. 1 with various structures omitted for simplicity in depiction.

FIG. 3 is a bottom view of the device of FIGS. 1 and 2 and is shown partly broken away to depict a movably supported roller received in its associated guide slot.

Referring now jointly to FIGS. 1 and 3, it is seen that movably supported rollers 21 and 29 have associated therewith respective J shaped left and right tension arms 34 and 36, movably supported rollers 21 and 29 suitably being linked to the ends of the vertical legs of the arms by a screw mounting or other suitable arrangement. The angles of tension arms 34 and 36 have thereon spring engaging studs 35 and 27 on which respective ends of springs 38 and 40 are mounted, the other ends of springs 38 and 40 suitably terminating at a center 41 such as a post mounted on the rear face of front plate 22.

Figure 4:
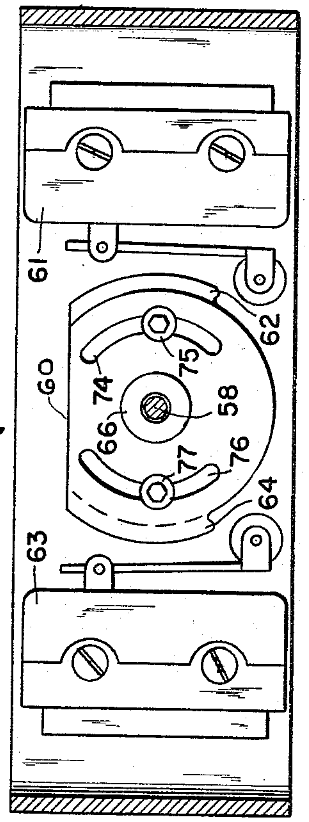
FIG. 4 is a section taken along line 4—4 of FIG. 3 looking in the direction of the arrows.

In FIG. 3, it is further seen that a microswitch carrying plate assembly 50 is spaced from the rear surface of front plate 22 by a bearing block 52 and a bearing spacer 54. The terminus 56 of the horizontal leg of tension arm such as right tension arm 34 has affixed thereto a shaft 58 which extends through assembly 50. Mounted fast on shaft 58 is a cam assembly 60 comprising a sandwich of a pair of cams 62 and 64 which are suitably positioned to have substantially diametrically angularly displaced cam surfaces. The angular displacement may be readily varied in accordance with a given design as shown in FIG. 4. Associated with cams 62 and 64 are microswitches 61 and 63. As will be shown later in the description of FIGS. 6–8, each cam surface effectively functions as the movable arm of a double pole, double throw switch and is responsive to the counter-clockwise or clockwise movement of the associated tension arm to the left or right respectively to cause the motors and brakes to operate to regulate the tension in the feedout and takeup loops in the tape.

Figure 5:
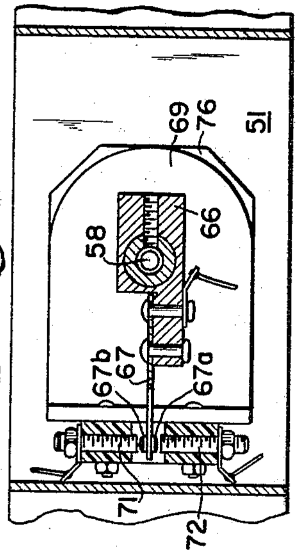
FIG. 5 is a section taken along line 5—5 of FIG. 3 looking in the direction of the arrows.

Shaft 58 further extends through portion 51 of assembly 50 at which point it has mounted fast thereon an actuator 66, which as shown in FIG. 5 comprises an inverted L shaped member having a tab 67 extending therefrom. The terminus of tab 67 has on each side thereof an electrical contact. Also mounted on shaft 58 to be freely rotatable thereon is the vertical arm 69 as shown in FIG. 3 of an L shaped member 68, the bifurcated horizontal arm 70 of member 68 having extending inwardly from its opposite sides a pair of studs 71 and 72 which terminate with a slight space therebetween. As seen in FIG. 5, the lower end of tab 67 is received in this space with the contacts thereon in registration with the termini of studs 71 and 72, tab 67 normally not being in contact with one of these termini. Inverted L shaped member, i.e., actuator 66 and L shaped member 68 comprise what may be conveniently denoted as an anticipation assembly, its operation being further described hereinbelow. Actuator 66 is maintained spaced from the vertical arm 69 of L shaped member 68 through the action of a spacer and a spring assembly 74. A friction disc 76 is provided between assembly 50 and arm 69 of L shaped member 68 to provide a clutch-like action to the anticipation assembly. The anticipation assembly functions as a switch and accordingly electrical leads are provided to studs 71 and 72.

FIG. 4 shows the cam sandwich 60 and its associated microswitch arrangement. It is seen that each cam of a sandwich is of circular configuration, each having a tablike cam surface. The provision of arcuate slots 74 and 76 and slot screws 75 and 77 enables the varying of the presetting of cams 62 and 64. As shown in FIG. 4, the cams are in a null position. Clockwise motion (as viewed in FIG. 4) of shaft 58 causes the actuation of microswitch 61 and counterclockwise motion of shaft 58 causes the actuation of microswitch 63. As stated hereinabove, each cam effectively functions as the movable arm of a double-pole, double-throw switch so that when a microswitch such as switch 61 or 63 is tripped, two switching actions occur in the circuit of FIGS. 6–8.

Since the structure of the left half of the device depicted in FIG. 3 corresponds to that of the right half, corresponding elements have been given the same numerical designation where appropriate, but with the prime notation. It is of course realized that left and right halves of FIG. 3 are symmetrical, i.e., correspondingly constructed.

In considering the mechanical operation of the device of FIGS. 1–5, let it be assumed that because of increased tension in the tape feedout loop, tension arm 34 is caused to move to the right as viewed in FIG. 1. Consequently, shaft 58 is caused to move in a counterclockwise direction as viewed from the rear, whereby cam sandwich 60 also moves in a counterclockwise direction to trip microswitch 63. Concurrently, actuator 66 is also moved in a counterclockwise direction, whereby its tab contact 67A makes contact with stud 72. As will be shown in the description of the circuit of FIGS. 6–8, such contacting is a necessary condition for the initiation of electrical actuation of the motor. Once such contact is made, actuator 66 and member 68 rotate together in contact as shaft 58 is caused to rotate by the rightward movement of tension arm 34.

When right motor 14 is actuated due to the tripping of microswitch 63 and the contacting of member 68 and actuator 66, it is caused to rotate in a direction to turn tape payout reel 10 counterclockwise to pay out more tape and thereby permit tension arm 34 and thereby cam sandwich 60 to move in a direction to deactivate switch 63. Once right motor 14 is actuated whereby the rotational direction of shaft 58 is reversed, in this situation, as shaft 58 now rotates in the opposite direction, actuator 66 moves with shaft 58. However, the action of friction disc 76 tends to impede the return motion of member 68 whereby member 68 and actuator 66 separate from contact prior to the deactivation of switch 63 by the return movement of cam sandwich 60 to the null position. As will be hereinafter seen, this operation of actuator 66 and member 68 (the anticipation assembly) results in the halting of rotation of the motor involved without simultaneously energizing its associated brake. According to the electrical system, the brake is energized only if a microswitch such as switch 63 is untripped and the anticipation assembly is in the deactivated state. The result of the action of the switch comprising actuator 66 and member 68, i.e., the anticipation assembly, is to effectively match the motor speed to the speed of the tape reader drive and thereby to produce a damping effect on the oscillations of the tension arm. This, as has been seen, is accomplished by sensing the direction of sensing arm motion and, in response thereto, causing the rotating motor to be disconnected when the arm is moving in the direction of the neutral zone.

To understand the action of the anticipation assembly, there must first be realized the principle that on-off tape transport devices for bidirectional tape movement have three zones, viz., a takeup zone which exists in the situation of too much tape in the tape reel slack loop, a neutral zone which corresponds to the presence of an approximately proper amount of tape in the reel slack loop; and a payout zone which is the zone when insufficient tape is in the reel slack loop. For convenience of explanation, the takeup and payout zones may be referred to as active zones.

If there are first assumed the following, viz., the absence of the anticipation assembly in the device of FIGS. 1–5; that a reel drive motor has a constant torque ($T_M$) when it is rotating; that the switch controlling one motor has no backlash (overtravel); that the brake when applied has constant torque $T_B$ and that the reel size is maintained substantially constant; then the following equations apply:

$$T=I\alpha \qquad (1)$$

(wherein T is either $T_M$ or $T_B$ as applied)

$$\omega_f=\omega_o+\alpha t \qquad (2)$$

$$\theta_f=\theta_o+\tfrac{1}{2}\alpha t^2 \qquad (3)$$

$$V_{rf}=V_{ro}+\alpha rt \qquad (4)$$

$$l_f=l_o-V_ct+V_ot+\tfrac{1}{2}\alpha rt^2 \qquad (5)$$

where T is torque, I is inertia, $\alpha$ is acceleration, $\omega$ is angular velocity, $\theta$ is angular displacement, $l$ is linear loop length, V is linear velocity of tape, $r$ is reel radius, and $t$ is time. In the above equations, of the subscripts, $f$ is final, $o$ is initial, $c$ signifies capstan of the reader, i.e., caused by the capstan input, $r$=rim, M signifies caused by the motor, B signifies caused by brake.

If it is assumed that a unit step of velocity is applied to the tape when it is initially at rest, ($V_{c_0}=0$) as the tape loop shortens, the point is reached where the tape motor is turned on to supply the tape loop. This motor turn-on point is conveniently defined as the reference point for the length of the loop whereby $l=0$ at this point. The reel motion is then accelerated until it pays out tape into the loop at the same rate as the tape being removed, i.e., $V_c$. Thus $$V_{rf_1}=V_e=\alpha_M rt, \text{ or } t=\frac{V_c}{\alpha_M r} \qquad (6)$$

wherein $f_1$ means final when tape feed and tape payout rates are equal.

$$l_{f_1}=-V_c\left(\frac{V_c}{\alpha_M r}\right)+\frac{1}{2}\alpha_M r\left(\frac{V_c}{\alpha_M r}\right)^2=-\frac{V_c^2}{\alpha_M r}+\frac{1}{2}\frac{V_c^2}{\alpha_M r}=-\frac{1}{2}\frac{V_c^2}{\alpha_M r} \qquad (7)$$

Equation 7 represents the low point of slack loop length.

Thereafter, the motor is adding tape to the loop at a rate faster than the tape reader capstan is removing it. This action continues until the loop length reaches the defined zero point, i.e., where the motor was turned on. At this point now $$l_{f_2}=0=-V_ct_2+\frac{1}{2}\alpha_M rt_2^2 \text{ or } t_2=\frac{2V_c}{\alpha_M r} \qquad (8)$$

and $V_{rf_2}=2V_c$. It is to be noted that $t_2$ is measured from the origin. It is further to be noted that at this time the velocity at the rim of the reel is actually twice the velocity of the tape reader capstan and, accordingly, tape is being paid out into the loop at twice the rate that the capstan removes it.

At the end of time $t_2$, the brake is actuated and decelerates the reel. If the reel is brought to a standstill without the opposite active zone switch being activated, continuation of tape motion will eventually cause the above set-forth process to repeat itself, i.e., as the reel slows down below rim velocity $V_c$, the loop will shorten again and since $l=0$, the process is repeated.

The peak excursion into the neutral (brake activated) zone is $$V_{rf_3}=V_c=2V_c-\alpha_\beta rt_3 \text{ or } t_3=\frac{V_c}{\alpha_\beta r} \qquad (9)$$

$$l_{f_3}=-V_ct_3+2V_3t_3-\frac{1}{2}\alpha_3 rt_3^2=\frac{V_c^2}{\alpha_\beta r}-\frac{1}{2}\frac{V_c^2}{\alpha_\beta r}=\frac{1}{2}\frac{V_c^2}{\alpha_\beta r} \qquad (10)$$

(wherein time, $t_3$, is measured from the end of time, $t_2$)

When $V_{rim}=0$ $$Vr_{f_4}=0=V_c-\alpha_\beta rt_4 \text{ whereby } t_4=\frac{V_c}{\alpha_\beta r} \qquad (11)$$

($t_4$ being measured from the end of $t_3$)

$$l_{f_4}=\frac{1}{2}\frac{V_c^2}{\alpha_\beta r}-V_ct_4+V_ct_4-\frac{1}{2}\alpha_\beta r\left(\frac{V_c}{\alpha_\beta r}\right)^2=0 \qquad (12)$$

In the immediately preceding section of this analysis, it was assumed that the tape reader capstan continued to remove tape from the loop after time $t_2$. If, on the other hand, the capstan direction is reversed after $t_2$, the reel adds tape to the loop at a velocity $2V_c$ and the capstan at the rate $V_c$. The time to bring the reel to zero angular velocity is $$t_3+t_4=\frac{2V_c}{\alpha_\beta r}$$

and at that time the loop length is $$l_f=V_c\left(\frac{2V_c}{\alpha_\beta r}\right)+2V_c\left(\frac{2V_c}{\alpha_\beta r}\right)-\frac{1}{2}\alpha_\beta r\left(\frac{2V_c}{\alpha_\beta r}\right)^2=\frac{4V_c^2}{\alpha_\beta r} \quad (13)$$

It is to be noted that Equation 13 represents eight times the non-reversal situation, i.e., Equation 10.

If there is now considered the situation wherein the neutral zone is not sufficiently wide to permit the reel to be fully decelerated before the sensing arm indicates the need to deactivate the brake and actuate the motor in the opposite direction, let it be assumed that the motor is still turning with a velocity corresponding to the rim velocity $V_o$ when $l$ is reached, thereby calling for the entrance into the opposite active zone. In this situation, tape is being supplied to the loop by the capstan and by the reel. The deepest penetration into the opposite active zone is expressed by $$V_{rf_5}=V_o-\alpha_M r t_5=-V_c \text{ and } t_5=\frac{V_o+V_c}{\alpha_M r}$$

If $V_o/V_c$ is set equal to $\eta$, then $$t_5=(\eta+1)\frac{V_c}{\alpha_M r} \quad (14)$$

wherein $t_5$ is measured from the entrance into the opposite active zone $$l_{f_5}=l_1+V_o t_5+V_c t_5-\frac{1}{2}\alpha_M r t^2$$

$$=l_1+(\eta+1)V_c\frac{(\eta+1)V_c}{\alpha_M r}-\frac{1}{2}\alpha_M r\left[\frac{(\eta+1)V_c}{\alpha_M r}\right]^2$$

$$=l_1\frac{(\eta+1)^2V_c^2}{\alpha_M r}-\frac{1}{2}\left[\frac{(\eta+1)^2V_c^2}{\alpha_M r}\right]$$

$$=l_1+\frac{1}{2}\left[\frac{(\eta+1)^2V_c^2}{\alpha_M r}\right] \quad (15)$$

Equation 15 shows the penetration into the opposite active zone with insufficient neutral zone width and consequent initial opposite velocity as compared with no initial opposite velocity as shown in Equation 7.

The rim velocity condition of leaving the opposite active zone where the neutral zone is too small, is expressed by $$l_{f_6}=l_1+\frac{(\eta+1)^2V_c^2}{2\alpha_M r}+V_c t_6-V_c t_6-\frac{1}{2}\alpha_M r t_6^2$$

and $$t_6=\frac{(\eta+1)V_c}{\alpha_M r}$$

(wherein $t_6$ is measured from the end of $t_5$)

$$V_{rf_6}=-V_c-\alpha_M r t_6=-V_c-\alpha_M r\frac{(\eta+1)V_c}{\alpha_M r}=-(\eta+2)\frac{V_c}{\alpha r} \quad (17)$$

Equation 17 shows that velocity at the end of the opposite active zone is now greater in magnitude by an amount $V_o$ as compared to the no initial velocity case, i.e., Equation 6.

From Equation 17, the excess speed implicit therein indicates that more time and distance are required in the neutral zone to stop the reel before attaining the first active zone again (back from the opposite active zone). If this time and distance is not available, this will lead to an oscillatory condition where successive penetrations into the active zones grow deeper and deeper. Thus, for given zone dimensions, reel inertia, and motor and brake torques, limitations are imposed on $V_c$ (capstan velocity) and allowable program freedom, the ability to start, stop, reverse at random, or a combination of these limitations as a compromise.

In the situation where the motor controlling switch does have backlash, Equations 1, 2, 3, 4 and 5 still obtain. However, in this situation, the motor switch does not halt the motor and apply the brake at $l=0$ but at a point further into the ideal neutral zone. This produces two effects, viz (1) the reduction of the effective neutral zone width, and (2) the making of the rim velocity $V_{rf_2}$ greater than $2V_c$. This results in the increasing of the possibility of the tension arms traversing neutral zone without providing time for the reel to be halted. Thus, backlash of the motor controlling switch further reduces allowable capstan velocity, $V_c$, and program freedom.

Now, in considering the function of the anticipation device, Equations 1, 2, 3, 4 and 5 again obtain as does the situation which is expressed by Equations 6 and 7. With regard to the situation expressed by Equation 8, after the motor has brought the reel rim velocity up to the capstan velocity, the tape loop begins to lengthen again, i.e., the tension arm moves in the direction of the neutral zone. Shortly thereafter, the anticipation assembly effects the cutting off of the motor so that the reel speed is just slightly in excess of the capstan velocity. Assuming small losses, the escape velocity from the neutral zone $V_{rf_2}$ is then $KV_c$ as contrasted with $2V_c$, an even greater velocity when switch backlash is present. K is a factor slightly greater than unity and depends upon the design adjustments of the anticipation assembly and friction losses ($K$=unity would be the optimum situation).

The requirements for optimum neutral zone length (a length which enables the avoidance of the reaching of the opposite active zone with any motor velocity) is shown in the following analysis. This analysis presupposes the worst situation, i.e., capstan reversal at the end of the time in the active zone. If $t_7$ is the time in this situation for the reel to halt in the neutral zone, then $$Vr_{f_7}=0=KV_c-\alpha_\beta r t_7 \text{ whereby } t_7=\frac{KV_c}{\alpha_\beta r} \quad (18)$$

$$l_{f_7}=V_c t_7+KV_c t_7-\frac{1}{2}\alpha_\beta r t_7^2$$

$$=\frac{(1+K)KV_c^2}{\alpha_\beta r}-\frac{1}{2}\alpha_\beta r\frac{K^2V_c^2}{\alpha_\beta^2 r^2}$$

$$=\frac{KV_c^2}{\alpha_\beta r}+\frac{K^2V_c^2}{\alpha_\beta r}-\frac{K^2V_c^2}{2\alpha_\beta r}$$

$$=\left(\frac{K}{2}+K\right)\frac{V_c^2}{\alpha_\beta r} \quad (19)$$

Thus, if K is taken equal to 1, then $$l_{f_7}=\frac{3V_c^2}{2\alpha_\beta r}$$

If K is taken to equal 1.24 then $$l_{f_7}\approx\frac{2V_c^2}{\alpha_\beta r}$$

If K is taken to equal 2, then $$l_f=\frac{4V_c^2}{\alpha_\beta r}$$

which corresponds to Equation 13.

From the foregoing, it is to be noted that the use of the anticipation assembly in accordance with the principles of the invention permits the neutral zone to be less than half that required for the same speed where it is not used and alternatively permits a better than $\sqrt{2}$ speed increase in capstan velocity, $V_c$ with an equal size neutral zone.

Figure 6:
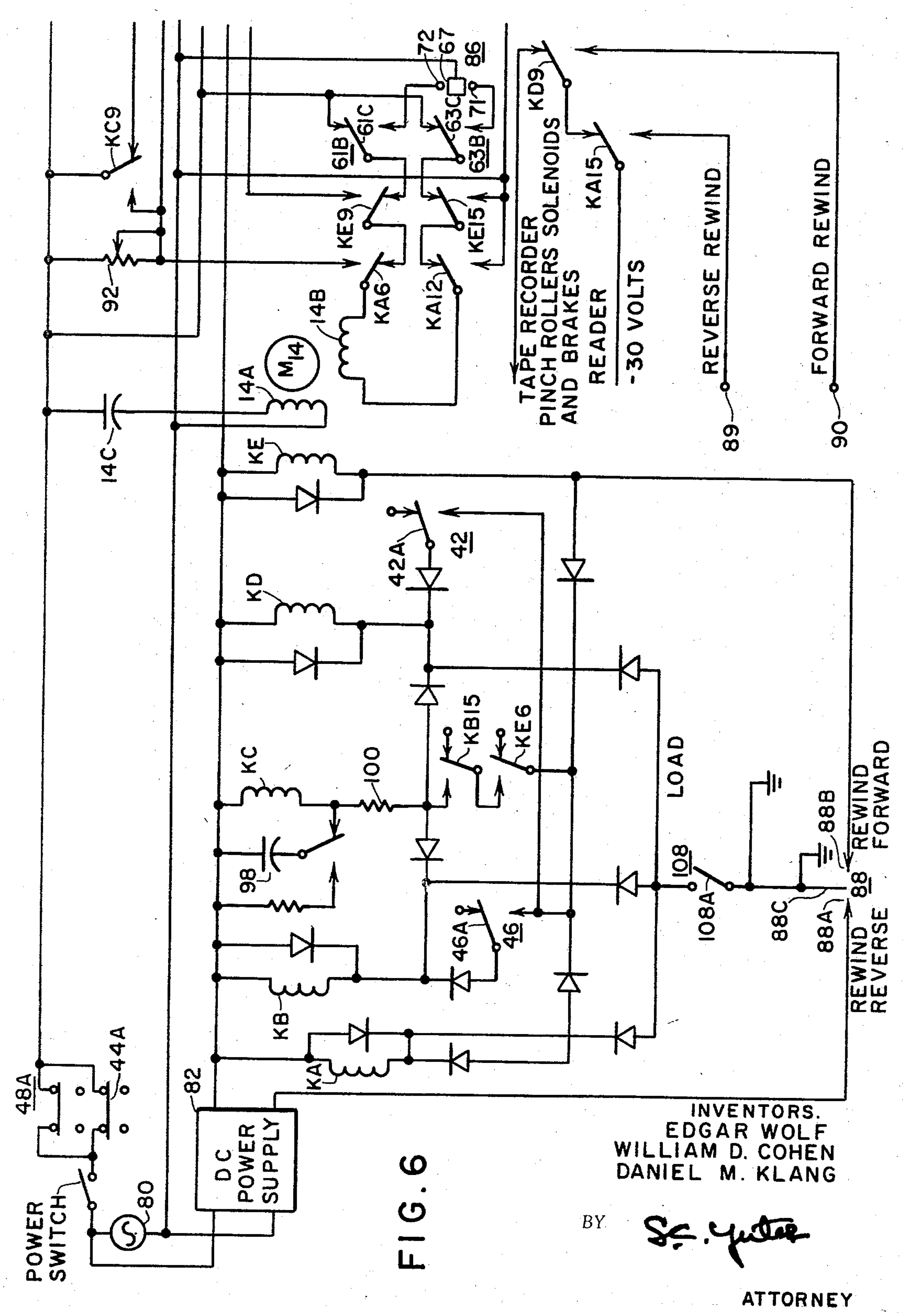
FIGS. 6 and 7 taken together as in FIG. 8 comprise a schematic diagram of the electrical system associated with the device of FIGS. 1–5.
Figures 7, 8:
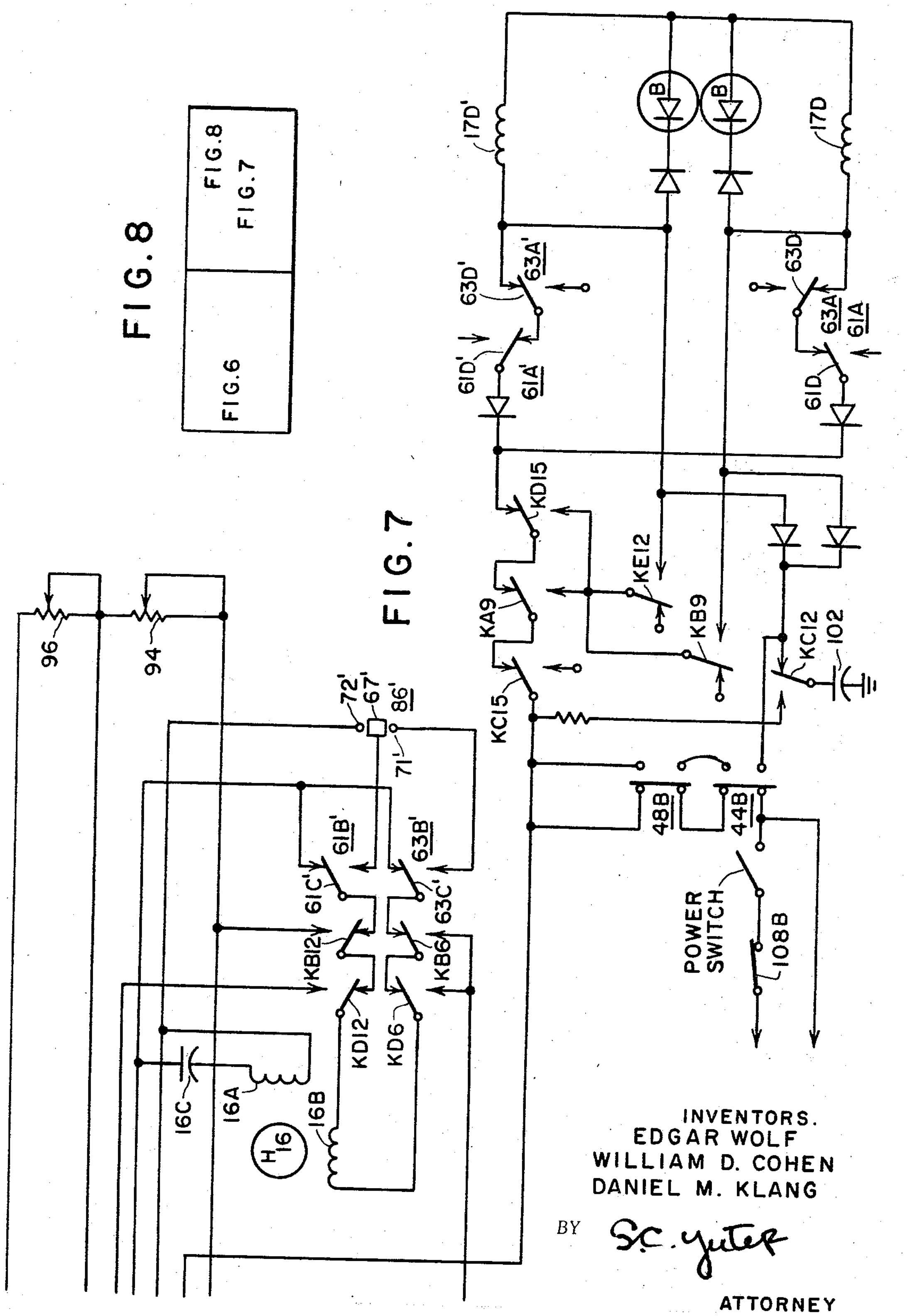

Referring now to FIGS. 6 to 8, there is shown therein a schematic depiction of the electrical system for effecting the operation of the tape transport of FIGS. 1–5 in accordance with the principles of the invention. FIGS. 6 and 7 depict the switch positions of the electrical system with tension arms 34 and 36 and the motor brakes 17 and 17' in a center or null position, i.e., the takeup and payout tape loops in the neutral zone of tension.

An AC source 80 which may suitably be the line voltage, is utilized to provide the AC voltage for motors 14 and 16 and for the providing therefrom of unidirectional voltages for operating the relay logic of the electrical system. For providing the latter unidirectional voltages, it is seen that the output of AC source 80 is applied to a stage 82 (legended DC power supply). Stage 82 may suitably include an AC supply transformer, a full-wave rectifier such as a diode bridge rectifier and an output filter. The unidirectional voltage produced at the output of stage 82 may suitably have a value of about 30 volts with its positive output terminal being connected to common and its negative output terminal at a voltage of about −30 volts.

Prior to describing the various modes of operation of the electrical system of FIGS. 6–8, there are first described the structure and operation of the motors and the tension arm/cam switches. The relay logic will be described in conjunction with these operations.

It is to be realized that the function of the tape transport of the invention is to feed tape into tape reader 18 at a desired proper tension and after such tape has been read, to enable the collection of the latter also at a proper tension. The system is entirely bidirectional, i.e., tape can be reeled out to tape reader 18 by the operation of motor 14 and, after the reading thereof, the slack in the tape can be taken up as a consequence of the action of motor 16 and the reverse can also be effected. Furthermore, the rewind capability of the tape transport is also bidirectional whereby there is enabled the performance by the transport of a high speed search function and the rewinding of the tape back on to feedout reel 10.

Motors 14 and 16 each contain respective capacitive windings 14A and 16A and respective main windings 14B and 16B. Capacitive windings 14A and 16A each are in series arrangement with capacitors 14C and 16C, respectively. Capacitors 14C and 16C function to shift the phase of the AC input to motors 14 and 16 by 90 degrees. This 90 degree phase shift is utilized initially to excite a motor. Main winding 14B of motor 14 is connected to a pair of switches 61B' and 63B' (these switches, of course, comprising cam sandwiches 60 and 60' and microswitches 61, 63, 61' and 63'). The latter switches change the AC input from one to the other sides respectively of the main windings. Such changing inputs in conjunction with the aforesaid 90 degree phase shifts of the capacitive windings are employed to rotate the motor either in the clockwise or counterclockwise directions.

As has been mentioned hereinabove, FIGS. 1–5 show the cam switch positions with the tension arms and the motor brakes in the null position. Switches 61B, 63B, 61B' and 63B' function to provide or to remove the return AC voltage line for the motor main windings. Switches 61A, 63A, 61A' and 63A' operate to activate and deactivate the motor brakes. Switches 61 and 63, 61' and 63' are operated by the movements of tension arms 34 and 36 respectively and are connected such that when a motor is "on," i.e., having AC voltage applied thereto, its brake is "off," i.e., voltage is removed therefrom. Pairs of switches 61 and 63, and 61' and 63' have to be in the null, i.e., normally closed position (as shown in FIG. 6–8) for actuating voltage to be supplied to the brake coils 17D and 17D', respectively.

*Operation of tension arms*

If it is assumed that FIG. 1 is viewed from the front whereby motor 14 is on the right and motor 16 is on the left, when right tension arm 34 is moved to the right out of the null zone because of increasing tension in the payout tape loop, it is necessary to increase the payout rate. It is noted in this operation that cam switches 61 and 63 are utilized.

This movement of tension arm 34 to the right causes the movable arms 61C and 61D respectively of switches 61B and 61A to go from their normally closed to their open positions, such switching effecting the removal of unidirectional voltage from brake coil 17D or motor 14, thereby deactivating brake coil 17D and simultaneously effecting the application of AC source voltage to the main winding 14B of motor 14 through contacts 67 and 72 of switch 86 (switch 86 is the anticipation assembly shown in FIG. 5 and comprises the contacts on tab 67, and studs 71 and 72), switch movable arm 61C of switch 61B, normally closed contact KE9 associated with relay KE, normally closed contact KA6 associated with relay KA, the main winding 14B of motor 14, normally closed contact KA12 associated with relay KA, normally closed contact KE15 associated with relay KE and the normally closed position, i.e., null position, of cam switch 63B. With this application of AC power to main winding 14B, motor 14 is caused to rotate counterclockwise (as viewed from the front) to cause reel 10 to pay out more tape into its slack loop. When tension arm 34 starts moving toward the null zone, contacts 67 and 72 open removing power from the motor 14 which coasts. When tension arm 34 reaches the null zone switches 61B and 61A return to their normally closed positions and brake coil 17D is energized.

When tension arm 34 is moved to the left out of the null zone because of increasing slackness in the payout tape loop, the movable contacts 63D and 63C respectively of switches 63A and 63B change from their normally closed to their open positions. Consequently, unidirectional voltage is removed from brake coil 17D and again in this situation, brake coil 17D is deactivated. Simultaneously, AC power is applied to main winding 14B through the contacts 67 and 71 of anticipation switch 86, contact 63C of switch 63B, contact KE15, contact KA12, main winding 14B, contact KA6, contact KE5 and the normally closed position of switch 61B. The application of AC power to main winding 14B in this situation effects clockwise rotation of motor 14 with the consequent taking up of tape by reel 10. When the direction of movement of tension arm 34 is toward the null zone the connection between contacts 67 and 71 opens removing power from the motor 14 which coasts. When tension arm 34 reaches the null zone switches 63A and 63B return to their normally closed position and brake coil 17D is energized.

It is again seen that anticipation assembly switch 86 functions to cause a reel motor to be turned off at a time when its associated brake coil is in the deactivated state. This situation exists when a tension arm is outside the null zone and starts moving toward the null zone. The effect of the operation of the anticipation assembly switch 86 is to match the speed of motor 14 with the speed of tape reader 18 (FIG. 1) and to provide a clamping effect on the oscillations of a tension arm.

In the operation of left tension arm 36, when it is moved to the right in response to excess slackness of tape in the tape takeup loop, the movable contact 61D' of cam switch 61B' moves from its normally closed to its open position to remove voltage from brake coil 17D' associated with motor 16 and simultaneously movable contact 61C' of cam switch 61B' also moves from its normally closed to its open position when contacts 67' and 72' of anticipation switch 86' make contact. AC power can now be applied through contacts 67' and 72', contact KB2, contact KD4, the main winding 16B of motor 16, contact KD6, contact KB12, and the normally closed position of cam switch 63B'. Consequently, motor 16 is caused to rotate counterclockwise to increase the takeup of tape in takeup reel 12 to the desired level.

When tension arm 36 is moved to the left because of increasing tension in the takeup tape loop, the movable contact 63D′ of switch 63B′ moves from its normally closed position to the open position, the negative unidirectional voltage being removed thereby from brake coil 17D′. Simultaneously, contact 63C′ of switch 63B′ moves from its normally closed to its open position. Provided that contacts 67′ and 71′ of anticipation assembly switch 86′ have made contact, AC power is now applied to main winding 16B of motor 16 through contacts 67′ and 71′ of anticipation switch 86′, the now open position of contact 63C′, contacts KB12 and KD6, main winding 16B, contact KD4, contact KB2 and the closed position of switch 61B′. Consequently, motor 16 is caused to rotate in the counterclockwise direction to increase the takeup of tape.

*Reverse rewind operation*

This operation is initiated by the placing of the movable contact 88C of rewind switch 88 in contact with its rewind terminal 88A. Such contacting applies ground potential to contact 88A, whereby relay KA is energized. With the energization of relay KA, the contacts associated therewith have their positions switched. Thus, the switching of the position of contact KA15 removes the negative unidirectional potential from the tape reader pinch rollers and applies the negative unidirectional potential to the reverse rewind terminal 89, terminal 89 conveniently being utilized as an indicating device for evidencing the reverse rewind operation. The switching of the position of contact KA9 removes the negative voltage from brake coils 17D′ and 17D. The switching of the positions of contacts KA12 and KA6 results in the application of AC power through a resistor 92 to main winding 14B of motor 14 thereby producing comparatively slow clockwise rotation of reel 10.

As motor 14 slowly rotates in the aforesaid clockwise direction, the slack in the tape loop is slowly taken up by tension arm 34. When tension arm 34 attains the outer edge 25 of guide slot 24 (FIG. 1) the movable contact 46A of switch 46 is switched from its normally closed position to its opposite position to cause relay KB to be energized. (Switch 46 corresponds to switch 46 in FIG. 1.) With the energization of relay KB, the positions of its associated contacts are switches. Thus, with the switching of the position of contact KB15, part of the circuit for relay KC is closed, i.e., relay KC is armed but not energized. The switching of the position of contact KB9 effects the application of negative voltage to brake coil 17D whereby the motion of motor 14 is halted. The switching of the position of contacts KB12 and KB6 effects the application of AC power through a resistor 94 to the main winding 16B of motor 16 thereby producing comparatively slow counterclockwise movement of motor 16 and, consequently, of takeup reel 12.

As motor 16 slowly rotates counterclockwise, the slack in the tape loop is slowly taken up by tension arm 36. When tension arm 36 attains the outer edge 31 of guide slot 30 (FIG. 1), the movable arm 42A of switch 42 is moved from its normally closed position to the opposite position, the latter switching enabling the energization of relay KE with the consequent switching of the positions of the contacts associated therewith. With the switching of the position of contact KE12, negative voltage is applied to brake coil 17D′ to effect the halting of the motion of motor 16. The switching of the position of contact KE6 now causes the energization of relay KC with the switching of the positions of the contacts associated therewith, such energization occurring after a delay, as determined by a capacitor 98 and a resistor 100.

With the switching of the position of KC15, the supply voltage is removed from both brake coils and the switching of the position of contact KC9 effects the shunting of resistor 92 and the application of substantially full AC power to main winding 14B of motor 14 whereby motor 14 rotates at substantially full rewind speed (clockwise) for the duration of the rewind operation. Simultaneously, the switching of the position of contact KC9 causes a resistor 96 to be inserted into circuit with winding 16B of motor 16 whereby motor 16 is caused to rotate still more slowly, i.e., to rotate counterclockwise under a drag. The latter drag action causes tape being rewound on reel 10 to be wrapped more tightly thereon.

If the ground voltage is removed from terminal 88A or the movable arm of switch 88 is moved back to its center off position, relays KA, KB, KC and KE are deenergized. When relay KC is deenergized, its associated contact KC12 moves back to its normally closed position. This causes the discharge of a heavy surge of current from capacitor 102 through diodes 104 and 106 to brake coils 19D and 19D′ respectively to simultaneously halt the rotation of motors 14 and 16.

*Forward rewind operation*

This operation is initiated by placing the movable arm 88C of switch 88 in contact with terminal 88B, whereby relay KD is energized, with the consequent switching of the positions of the contacts associated therewith. With the switching of the position of contact KD9, the unidirectional voltage is removed from the tape reader pinch rollers and brakes and is applied to forward rewind indication terminal 90. The switching of the position of contact KD15 effects the removal of the voltage supply from brake coils 17D and 17D′. The switching of the positions of contacts KD12 and KD6 effects the application of AC power to the main winding 16B of motor 16 through resistor 92 to cause motor 16 to rotate comparatively slowly in the counterclockwise direction.

As motor 16 slowly rotates, the slack in the tape loop is slowly taken up by tension arm 36. When tension arm 36 reaches the outer edge 31 of guide slot 32, the position of movable arm 42A of switch 42 is switched to effect the energization of relay KE and its associated contacts. The switching of the position of contact KE6 arms relay KC but the latter is not yet energized. The switching of the position of contact KE12 effects the application of unidirectional voltage to brake coil 17D′ to halt the rotation of motor 16. The switching of the positions of contacts KE9 and KE15 enables the application of AC power to the main winding 14B of motor 14 through resistor 94 to produce comparatively slow clockwise rotation of it and reel 10.

As motor 14 slowly rotates, tension arm 34 slowly takes up the slack in the tape loop. When tension arm 34 reaches the outer edge 25 of guide slot 24, switch 46 is moved to its opposite position to cause the energization of relay KB and the consequent switching of the positions of the contacts associated therewith.

With the energization of relay KB, the switching of the position of contact KB9 enables the application of supply voltage to brake coil 17D to halt the rotation of motor 14. The switching of the position of contact KB15 causes the actuation of relay KC after a delay as determined by the time constant of capacitor 48 and resistor 100.

With the energization of relay KC and the consequent switching of the positions of its associated contacts, the switching of the position of contact KC15 removes the voltage from the brake coils and applies it to —30 volts terminal. The switching of the position of contact KC9 effects the bypassing of resistor 92 to enable the application of substantially full AC voltage to main winding 16B of motor 16 whereby motor 16 then rotates at full rewind speed for the remainder of the forward rewind operation because of the shunting of resistor 92. This switching of the position of contact KC9 inserts resistor 96 into circuit to cause motor 14 to rotate under a drag. This drag action causes tape to be wrapped more tightly on the rewind reel 12.

To attain the end of the forward rewind conditions for the relays, either the ground connection is removed from terminal 88B or the movable arm 88C of switch 88 is moved to the center-off position to cause the relays to be deenergized. With such deenergization and the consequent switching of the position of contact KC12, the discharge of capacitor 102 provides a heavy surge of current to brake coils 17D and 17D' through diodes 104 and 106 respectively; the energization of the brake coils causing the simultaneous halting of both motors 14 and 16.

*External load control operation*

This operation enables the loading of tape on to the reels and is initiated by switching the position of the movable arm 108A of switch 108 to effect the energization of relay KA and the consequent switching of the positions of its associated contacts. With the switching of the position of contact KA15, the unidirectional voltage supply is removed from the solenoids contained in tape reader 18 (FIG. 1) and is applied to terminal 89. The switching of the position of contact KA9 arms brake coil 17D. It is to be noted that the switching of the positions of contacts KA6 and KA12 has no effect in the load operation.

It is seen that in this operation, when switch 108 is closed, that relays KB and KE are energized concurrently with the energization of relay KA. The energization of relay KB with the consequent switching of the position of its associated contact KB9 effects the application of voltage to brake coil 17D, thereby halting the rotation of motor 14. The switching of the positions of contacts KB6, KB12 and KB15 does not affect the load operation.

With the switching of the position of contact KE12, voltage is supplied to brake coil 17D' thereby halting the rotation of motor 16. The other contacts associated with relay KE do not affect the load operation.

Once relays KA, KB and KE have been energized by the closing of switch 108 with the consequent halting of the rotation of motors 14 and 16, tape may be loaded onto the tape reels.

*End of tape sense operation*

When both tension arms 34 and 36 swing to their respective innermost positions, switches 48 and 44 are actuated. The latter switches are chosen to be of the double-pole, double-throw type. Switches 48A and 44A function to interrupt the lines to motors 14 and 16. Switches 48B and 44B enable the application of supply voltage to brake coils 17D and 17D' to halt the rotation of motors 14 and 16. This operation occurs when a "no" tape or broken tape condition exists.

While there has been described what is considered to be a preferred embodiment of this invention, it will be obvious to those skilled in the art that various changes and modifications may be made therein without departing from the invention and it is therefore, aimed in the appended claims to cover all such modifications as fall within the spirit and scope of the invention.

What is claimed as new and desired to be secured by Letters Patent of the United States, is:

1. In a tape transport for moving tape comprising a pair of reel mount means adapted to have mounted thereon respectively a tape payout reel and a tape takeup reel, apparatus for controlling the rotation of at least one of said reels comprising, a motor means for rotating said reel, a brake means for preventing rotation of said reel, first means responsive to the tension of tape beyond a range of desired tension for both energizing said motor means and releasing said brake means to rotate said reel to change the tension of the tape, and means for sensing for a change of tension toward said desired range to only deenergize said motor means wherein said motor means coasts until the tension reaches said desired range where said brake means is reactivated for stopping rotation of said reel.

2. In a tape transport for moving tape comprising a pair of reel mount means adapted to have mounted thereon respectively a tape payout reel and a tape takeup reel, apparatus for controlling the rotation of at least one of said reels comprising, a motor means for rotating said reel, a brake means for preventing rotation of said reel, tension indicating means for indicating whether the tape tension is greater than, less than or within a given range of tape tension, first means responsive to said tension indicating means for releasing said brake means whenever the tape tension is outside said given range of tension, second means coupled to said tension indicating means and responsive to the indication of tape tension greater than said given range for energizing said motor means for rotating said reel in a first direction to decrease the tape tension, third means coupled to said tension indicating means and responsive to the indication of tape tension less than said given range for energizing said motor means for rotating said reel in a second direction to increase the tape tension, anticipation means responsive to changes in tape tension for deenergizing said motor means when said reel is rotating in said first direction and the tape tension begins decreasing and when said reel is rotating in said second direction and the tape tension begins increasing.

3. A tape transport as defined in claim 2 wherein said tension indicating means comprises a spring loaded member which is urged in opposite directions about a given position respectively in response to an increase and decrease in tape tension outside the given range of tape tension, a shaft associated with said member which is rotated in opposite directions in response to the respective directions of movements of said member, and wherein said first, second and third means include cam means comprising a pair of intimately contacted angularly displaced cams mounted on said shaft to be rotatable therewith, each of said cams having a switch means associated therewith for controlling said brake means and the energizing of said motor means.

4. A tape transport as defined in claim 3 wherein said anticipation means comprises a bracket having a first leg freely mounted on said shaft and a bifurcated second leg substantially perpendicular to said first leg, respective registered lugs extending inwardly from the opposite ends of said second leg, the termini of said lugs defining space therebetween, a friction structure in contact with said first leg to impede the free rotation of said bracket about said shaft and an element fixedly mounted on said shaft to be rotatable therewith and disposed such to extend into said space, said element having electrical contacts on opposite sides of the portion thereof in said space, each of said electrical contacts respectively being in registration with and spaced from said termini, said termini and said electrical contacts cooperating to provide switching means to control the deenergizing of said motor means.

5. The tape transport of claim 2 wherein said motor means comprises an electric motor rotatable in first or second directions in accordance with the phase of electric current fed thereto.

6. A tape transport for moving tape conprising: a pair of reel mount means adapted to have mounted thereon respectively a tape payout reel and a tape takeup reel; a bidirectionally rotatable electric motor including at least first and second input terminals for receiving an electric current, the direction of electric current flowing through said terminals determining the direction of rotation of said motor, said motor being mechanically connected to one of the reels; an electrically actuatable brake means which when energized brakes rotation of said one reel; a source of electric current including at least two output terminals for transmitting oppositely phased electric current; tape-tension responsive switch means electrically interposed between said source of electric current and said motor and said brake means for connecting said brake means to and for disconnecting said motor from said source of electric current when the tension of the tape is within a given range of tension, and for disconnecting said brake means from and for connecting said motor to said source of electric current when the tension of the tape is without said given range of tension, the first and second input terminals of said motor being connectable to the first and second output terminals, respectively, of said source of electric current to rotate said motor in a first direction when the tension of the tape is greater than the given range, the first and second input terminals of said motor being connectable to the second and first output terminals, respectively, of said source of electric current to rotate said motor in a second direction when the tension of the tape is less than the given range; and tape-tension change anticipation means including switch means electrically interposed in the circuit between said source of electric current and said motor for interrupting the flow of current between said motor and said source of electric current when said motor is rotating in said first direction and the tension of the tape decreases, and when said motor is rotating in said second direction and the tension of the tape increases.

7. The system of claim 6 further comprising means for supporting a portion of the tape in a tape loop whose size changes in accordance with the tension of the tape, said supporting means including a rotatable member which rotates in either direction from a null zone as the tape tension deviates in either direction from the given range of tape tension and cam means on said rotatable member and wherein said tape-tension responsive switch means is operable by said cam means.

8. The system of claim 6 further comprising means for supporting a portion of the tape in a tape loop whose size changes in accordance with the tension of the tape, said supporting means including a rotatable member which rotates in either direction in accordance with the tape tension, and wherein said tape-tension responsive switch means comprises a first electrical contact insulatively coupled to said rotatable member and electrically connected to one of the output terminals of said source of electric current, a contact support member clutchingly connected to said rotatable member so as to rotate with said rotatable member only when receiving an applied torque, said contact support member including a pair of spaced second and third electric contacts straddling said first electric contact and in the path of rotation thereof whereby when said first electric contact is rotating and engages one of said spaced contacts said contact support member rotates therewith until the direction of rotation of said rotatable member changes, said second and third electric contacts being connectable to the first and second input terminals of said motor means, respectively.

References Cited

UNITED STATES PATENTS

| | | | |
|---|---|---|---|
| 2,221,543 | 11/1940 | Johannessen | 242—54 |
| 2,904,275 | 9/1959 | Selsted et al. | 242—55.12 |
| 2,991,022 | 7/1961 | Wallens | 242—75.51 |
| 3,131,339 | 4/1964 | Burr | 242—55.12 |
| 3,172,611 | 3/1965 | Harris | 242—55.12 |

FRANK J. COHEN, *Primary Examiner.*

GEORGE MAUTZ, *Examiner.*

UNITED STATES PATENT OFFICE
CERTIFICATE OF CORRECTION

Patent No. 3,323,736 June 6, 1967

Edgar Wolf et al.

It is hereby certified that error appears in the above numbered patent requiring correction and that the said Letters Patent should read as corrected below.

In Figure 6 of the drawing, for the letters KD identifying the relay, read -- KE --; for the letters KE identifying the relay, read -- KD --; for the line connection from the D. C. power supply to the rewind terminal 88A, read -- a line connection from the D. C. power supply to ground potential --; from the line connection extending between the diodes (not numbered) which are located between relay KA and switch 46, read -- a line connection to the rewind terminal 88A --; in Figure 7 of the drawing at the two diodes (not numbered) located adjacent the contact KC12, for the upper diode connected to brake coil 17D', read -- 106 --; for the lower diode connected to brake coil 17D, read -- 104 --; column 4, line 17, for "27" read -- 37 --; column 6, line 29, for "$V_e$" read -- $V_c$ --; line 65, for $\ell_{f3}=-V_c t_3+2V3t_3-\frac{1}{2}\alpha_3 r t_3{}^2$ read $V_c t_3+2V_c t_3-\frac{1}{2}\alpha_\beta r t_3{}^2$ column 7, line 64, for "$-(n+2)\frac{V_c}{\alpha r}$" read -- $-(n+2)\frac{V_c}{\alpha_M r}$ --;

column 8, line 65, for $\ell_f=\frac{4V_c{}^2}{\alpha_\beta r}$ read $\ell_{f7}=\frac{4V_c{}^2}{\alpha_\beta r}$ column 9, line 49, for "61B' and 63B'" read -- 61B and 63B --; column 10, line 70, for "KB2" read -- KB12 --; same line 70, for "KD4" read -- KD12 --; line 71, for "KB12" read -- KB6 --; column 11, line 11, for "KB12" read -- KB6 --; line 12, for "KD4" read -- KD12 --; same line 12, for "KB2" read -- KB12 --; line 14, for "counterclockwise direction to increase" read -- clockwise direction to decrease --; column 12, line 57, for "48" read -- 98 --.

Signed and sealed this 15th day of April 1969.

(SEAL)
Attest:

EDWARD M.FLETCHER,JR.
Attesting Officer

EDWARD J. BRENNER
Commissioner of Patents